United States Patent [19]

Yung et al.

[11] Patent Number: 4,560,538
[45] Date of Patent: Dec. 24, 1985

[54] CURING AND LEACHING PROCESS FOR METAL ORES

[75] Inventors: Kenneth K. Yung, Kingwood, Tex.; Craig B. Barlow; Joe R. Glass, both of Casper, Wyo.

[73] Assignee: Exxon Research and Engineering Co., Florham Park, N.J.

[21] Appl. No.: 105,184

[22] Filed: Dec. 19, 1979

[51] Int. Cl.$^4$ .............................................. C01G 43/00
[52] U.S. Cl. ........................................ 423/3; 423/20; 423/658.5
[58] Field of Search ...................... 423/3, 18, 20, 658.5

[56] References Cited

U.S. PATENT DOCUMENTS

| | | | |
|---|---|---|---|
| 3,808,306 | 4/1974 | Smith et al. | 423/20 |
| 3,932,276 | 1/1976 | Ford et al. | 423/18 |
| 4,017,309 | 4/1977 | Johnson | 423/20 |
| 4,175,108 | 11/1979 | Poitte | 423/20 |
| 4,225,563 | 9/1980 | Hasegawa et al. | 423/3 |

Primary Examiner—Edward A. Miller
Attorney, Agent, or Firm—David A. Roth

[57] ABSTRACT

The process for recovering metal values from mineral ores containing small amounts of metal, which comprises specific curing and conditioning steps followed by formation of a slurry of critical portions, which is processed by a countercurrent filter means to efficiently remove dissolved metal salts. The process of the invention permits rapid and efficient recovery of metal values from ores, such as uranium ores, and permits the economical use of very low grade ores.

6 Claims, 3 Drawing Figures

CURING AND LEACHING PROCESS FOR METAL ORES

BACKGROUND OF THE INVENTION AND PRIOR ART

In the minerals industry, occurrences of ore bodies or parts of ore bodies, which are either too small in total reserves or too low in grade to justify milling or other conventional processing are common. Also, many such ore bodies occur long distances from existing milling or processing facilities. Commonly these ore deposits have been either left untreated or have been treated by processes requiring a relatively low capital investment. Such processes include heap, vat, or in situ leaching. Unfortunately, these processes usually sacrifice percentage and rate of recovery in return for the benefit of lower capital investment and operating costs. And, the overall economics are often marginal at best. In addition, recent environmental and regulatory restrictions, particularly in the uranium industry, such as tailings disposal and site reclamation, have further diminished the opportunity for profitably developing such small or low grade ore bodies.

It is known in the prior art to cure metal containing ores and then subject them to a leaching process to remove metal values. Nevertheless, the prior art has no contemplation or awareness of Applicants' particular solution to the problem, which accomplishes an extraction of metal values from low quality ores in an expedient and economic manner. Moreover, Applicants' technique can be accomplished with portable equipment.

The following represents an analysis of the most significant references known to Applicants. These are:

U.S. Pat. No. 3,269,832 to Abell et al discloses a process for the extraction of metal values, which comprises comminuting a metal-containing ore and moistening the resulting crushed ore with a small amount of leachant, such as sulfuric acid to total moisture content of between 6 and about 18 percent. Thereafter, the moistened ore is allowed to stand in a reactor tank for at least one hour and up to 24 hours. The thus-cured ore in a relatively thick layer is thereafter countercurrently washed with no agitation and metal values are extracted from the wash water.

Abell's process stresses *agglomerization* of fine ore particles as a critical feature to limit the detrimental effect of slimes on liquid flow rate. This process will not operate without agglomeration. The ore is never pulped but rather maintained in the agglomerated state, followed by quiescent submergence in wash solution and then draining off the wash solution by gravity flow. The mechanism by which this is accomplished is complex, bulky, and awkward. Gravity flow wash is critical, as opposed to forced flow, e.g., suction filtration, which is expressly disclaimed. Forced flow in Abell's process causes undesirable reduction of wash liquid flow.

U.S. Pat. No. 4,017,309 to Johnson discloses a layer-leaching method for the recovery of metal values from metal-containing ores. Although Johnson characterizes his method as concerning a "thin" layer, actually it is a relatively thick layer.

This method comprises crushing the ore, and adding a leachant such as sulfuric acid, adjusting the moisture content to within the range of about 8 to 18 percent by weight, and thereafter allowing the ore to cure for about two days. Subsequently, the cured ore is spread upon an impermeable leach pad, preferably in a layer about one-half to one and one-half meters thick and a weak leach solution is sprayed over the surface of the layer of ore. Metal values are slowly leached from the ore as the solution passes through. The dissolved metal values are subsequently recovered from the pregnant liquor. The thickness of the thin layer of ore is said to be critical and is much thicker than that of Applicants'. Moreover, Johnson requires induration, e.g., hardening and strengthening of his ore particles as a critical requirement for his process during the cure stage. (Induration is accomplished through agglomeration.)

In Applicants' process, agglomeration is undesirable because it tends to prevent achievement of very fast recovery of metal values.

BRIEF SUMMARY OF THE INVENTION

Figure 1:
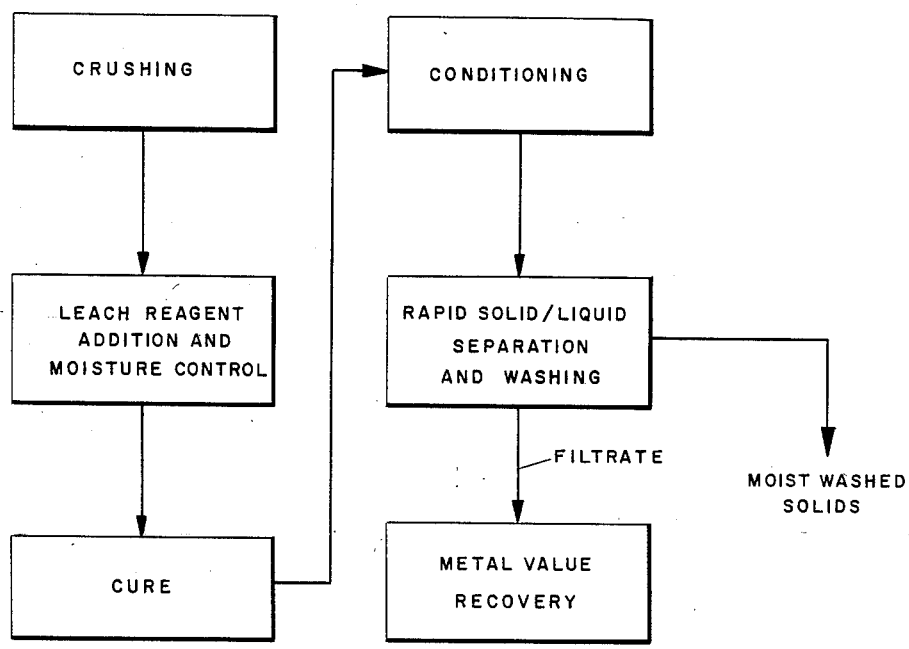
FIG. 1 is a block schematic showing the overall sequence of process steps in the preferred inventive technique.

Moderately crushed metal-containing ores are cured with a cure reagent and optionally preconditioned in a particular, special manner to place them in condition to be rapidly and effectively processed by a forced-flow, multiple-stage, washing device, e.g., a horizontal belt vacuum filter means, preferably with special washing steps.

This results in greatly improved metal value recovery and a low ratio multiple-stage wash with extremely favorable economics. Moreover, the design is compact and therefore is conveniently portable. The technique is especially applicable to ores which have such a low economic value, that they would be of little or no interest in conventional metal extraction sequences.

DETAILED DESCRIPTION OF PREFERRED EMBODIMENTS

It has been discovered and forms an essential concept of this invention that a novel and unobvious rapid leaching/high recovery/low capital processing facility means is provided. This facility can be completely portable in nature and is capable of producing well-washed, dewatering tailings with a low wash ratio. The ability to operate with low capital, high extraction and rapid processing maximizes profitability on a minimum investment.

An additional advantage of the instant invention is that the cost of disposal of tailings and any accompanying environmental restrictions are minimized by in-pit disposal capabilities of dewatered solids and by the low wash ratio which minimizes liquid waste disposal requirements.

The preferred apparatus for carrying out the technique of the invention is extremely portable. This results in quick site reclamation, which is also inexpensive and relatively easy. The portability feature also means that a given processing facility can be reused several times, and therefore, it is not necessary for the entire capital investment to be paid out by a single, small or low grade ore body.

In brief the invention comprises a process, in which ore delivered from a mine is first subjected to comminution as needed. Probably crushing alone would suffice for sandstone ores in most cases, to adequately liberate and expose metal values in the ore particles to solubilizing ions of the cure reagent. For other types of ores, grinding to finer particle sizes will probably be necessary.

The comminuted ore is transferred to a cure reagent-addition-and-mixing device. Such a device can be similar to a rotary kiln. Water and cure reagent can be added in any appropriate sequence. For uranium ore, typical cure reagents would be sulfuric acid with an appropriate oxidant. The concentration of curing agent required will be apparent to one skilled in the art. Water is added if needed to adjust the ore moisture content to the level appropriate for the curing step, preferably about 10-20% by weight for uranium ores. The ore on which the cure reagent is soaked is then deposited in a curing pile or bin in which it is allowed to sit for sufficient time for the cure reagent to react with the ore, rendering, e.g., converting, the metal values into a soluble state.

In the invention, the importance of the cure stage in terms of its impact on subsequent process steps is enormous. This process is not like art processes involving curing of ores. In the process of the instant invention, *solubilization* (as defined subsequently) of all metal values of interest *must* occur in the cure stage. The reason for this is the very short *leach* time which will occur in a subsequent process step, e.g., on a belt filter. Therefore, all cure reagents necessary to achieve solubilization must be added to the ores before the curing stage is completed.

All the prior art processes allow for additional contact time between cure reagents and ores down stream of the curing stage to accomplish additional solubilization. This is not to imply that 100% solubilization always occurs in the cure stage of the instant invention. There are nearly always some insoluble metal components present in ores. The technique of the invention contemplates that the cure must accomplish solubilization of all values capable of being solubilized by the reagents used.

Another extremely important facet of the cure stage is to limit the moisture content of the curing ores so that no seepage of solution or reagents occurs from the cure piles. This is important for the solubilizing reaction as well as metal recovery and environmental concerns. Generally, a suitable moisture range can be from 5 to 25 weight percent, most preferably 13 to 18 weight percent. Whatever moisture content is employed, it is essential that sufficient moisture should always be present to provide a transport medium for diffusion of reagents to all ore particles containing metal values.

There is one other important facet of the cure stage. That is, no reagent, recycle solution, or any other material can be added to the ores at any stage of the process, up-stream of the filtration, that will interfere with subsequent dewatering and washing steps. Nor can the ore particles be coated in any way so as to limit diffusion of the cure reagents into or metal values out of the ore particles. An example would be organic material contained in the water. If in high enough concentration, it could cause both of the above described undesirable effects.

After sufficient curing time, typically 2 to 72 hours, the cured ore is optimally conditioned briefly in the preparation for the rapid leaching step. In some cases conditioning can be omitted.

By conditioning, it is meant the step of preparing the cured material for processing in a subsequent dewatering/washing step. For the purposes of this invention conditioning is effectuated in such a manner as to transpose the cured ores into a pumpable state, e.g. a slurry of ore in water. In this state, removal of oversize particles can be effectuated if necessary. When forced flow washing devices of requisite capability become available, it is possible that the conditioning step can be omitted. When forced flow dewatering/washing devices such as horizontal belt vacuum filters are to be employed, it is important that the conditioned ore be in a flocculated state when it is deposited on the filter. Desirably, flocculent is introduced at the latter stages of conditioning immediately prior to said deposition. Premature addition of flocculent can result in floc destruction because of factors such as turbulence.

Unless the slurried ore is flocculated before deposition on a vacuum filter, the ore on the filter will be highly resistant to efficient dewatering and washing. If pressure filtering is used, then flocculation is not necessary, but the use of a filter aid may be required. This should maintain the permeability of deposited ore under operating pressures exceeding atmospheric.

Other dewatering/washing means such as centrifugation may not require flocculants or filter aids. It is known that dissolution is greatly enhanced by the constant contact of ore particles with fresh solution. Therefore, in conventional leaching, such contact is accomplished by agitation of a slurry of ore particles in water which contains a leaching reagent (not a curing step).

Such a process requires many large expensive vessels equipped with expensive agitators. The investment capital requirements and the operating expenses such as power requirements of this conventional equipment are very high. Moreover, the equipment is not economically operable for remote operations.

A fundamental, unobvious conceptualization has resulted in the technique of the invention whereby the conventional leaching step is entirely omitted without the concomitant sacrifice of not constantly exposing ore particles to fresh wash solution. Although, the Abell and Johnson teachings discussed above omit conventional leaching, their process suffers from the severe disadvantage of lack of constant exposure of all ore particles to wash liquid. This requires that the washing step of Abell and Johnson be carried out over an exceptionally long time, e.g., several days.

In very pronounced contrast, Applicants' vastly different inventive process utilizes a dewatering/washing step requiring a few minutes at most. This results in an order of magnitude difference in time, so great as to be a difference in kind rather than degree.

Leaching, as the term is used herein, means to separate the soluble components by dissolving them out by the action of a percolating wash liquid. Given this definition, the metal values are *solubilized* in the cure stage, but no leaching occurs. By solubilizing, it is meant that the metal values are converted from the insoluble to the soluble state by chemical reaction with the reagents. But, they are not necessarily dissolved at this stage. Because of the relatively low moisture content of the cured ores, some minor dissolution may occur during curing.

Complete dissolution does not occur until the ore particles are contacted with enough liquid for a sufficient amount of time to allow complete transfer of the solubilized metal values from the ore particles to the bulk liquid.

For the purposes of this invention, this metal value transfer begins in the conditioning stage with the introduction of bulk liquid and is completed in the dewatering/washing stage by the forced flow of wash solution through the deposited cake of ore particles.

It is known that dissolution is greatly enhanced by the constant contact of ore particles with fresh solution. The displacement mechanism employed in a washing belt-filter will continually draw washing solution through the cake of ore particles. The technique of the invention of actual metal dissolution or completing the dissolution process on a forced flow washing device, per se, is an important advance in the art. In contrast, in all present belt filter applications, the metal dissolution process is *complete* before the ore slurry is introduced onto the filter mechanism.

It is to be noted that screening or removal of tramp material or oversized material that could hinder filtration or wash efficiency may be critical for proper process operation.

The term "multiple-stage" washing as used herein is generic. It includes countercurrent or cocurrent washing. Depending on ore properties and other conditions, a cocurrent multiple stage wash system may actually be superior to countercurrent washing.

The conditioning as has been described involves pulping the cured ore in wash solution with mild agitation for a brief period, typically 15 minutes or less, to prepare the cured ore for feeding to a rapid solid/liquid separation device such as a belt filter. In essence the conditioning step may also include a particle size separation feature which would remove the easily washed coarse solids fraction in advance of the rapid leaching step. The conditioned cured ore is fed to one or more rapid solid/liquid separation devices with washing capabilities.

The composition of the cure agent will be determined by the characteristics of the ore and the specific chemical reactions being employed for recovery of the desired mineral values. Although the invention is described with particularity, in respect to uranium ores, it should be understood that it is applicable for use with other ores, having recoverable amounts of metal values such as copper, vanadium, gold, silver, tin, etc. The particular chemical reactants necessary for whatever mineral value or metal value is being processed is well known to the art and need not be elaborated upon. Moreover, the quantity necessary to achieve the particular reactions within the defined time frames of this invention are well understood by those skilled in the art.

By subjecting the cured ore to multiple stages, as needed, of washing and rapid solid/liquid separation the solubilized metal values are quickly leached from the cured ore, thus producing a pregnant liquor rich in metal values and a washed dewatered solid phase depleted of metal values and disposable as tailings.

It has been discovered as a key aspect of this invention that a device such as a countercurrent washing belt filter is well suited for performing the rapid leach step of the process. It can quickly produce a rich pregnant liquor and dewatered tailing solids with a minimal washing ratio of wash solution to ore. The pregnant liquor is processed for recovery of metal values and the tailings solids are transported to tailings disposal.

The preferred horizontal belt vacuum filter means of this invention is obtained from the Denver TM Belt Filter. The apparatus comprises a stainless steel framework with a drive and tail pulley located at each end. An endless, reinforced, rubber transporter belt with tapered lateral grooves is fitted over these pulleys and is supported by a cushion of air. The drive pulley is driven by a variable speed motor, either hydraulic or electric.

Drainage holes are located in the center of the transporter belt. Directly below the drainage holes are the vacuum box, vacuum seals, wear belts, and flexible filtrate drainage hoses. Rubber curbs are bonded to the edges of the belt. These curbs flatten out when passing over the drive pulley.

An endless filter cloth is fitted over the top of the transporter belt and is locked into position by vacuum. After the leaching-drying cycle, the cloth passes over the drive pulley and separates from the transporter belt.

After the cake is removed at the discharge roller, the cloth passes through a series of cloth cleaning sprays, a cloth tensioner, and an automatic tracking and depleting system before it is again fed back onto the belt and enters the vacuum/feed area.

Cured uranium ore slurry which has been suitably conditioned is fed by a distributor onto the cloth at the tail end of the filter. Vacuum is applied and the filtrate flows along the tapered grooves, through the drainage holes, and into the vacuum box where it drains into the filtrate receivers.

Dams separate the filtration into three major filtration zones: that is the Form Zone, Wash Zone, and Drying Zone. Washing filters are designed so the cake wash distributors and required dams are located between the Form and Drying Zones.

The filter device can be readily adjusted to employ either cocurrent washing or countercurrent washing. Dilute filtrate can be recycled to be used as part of the conditioning liquid or one of the wash liquids.

DETAILED DESCRIPTION OF THE DRAWINGS

The general overall sequence of process steps in the technique of the invention is set forth in FIG. 1. In sequence, the ore is crushed, and solubilizing reagents and moisture are added to the crushed ore in preselected controlled portions. The mixture of ore, reagent, and moisture is then cured followed in the preferred process by conditioning for filtration. The slurry that is produced from conditioning is then subjected to multiple stage washing on a belt filter. The filtrate is further processed for metal value recovery and the solids are transported to tailings disposal.

Figure 2:
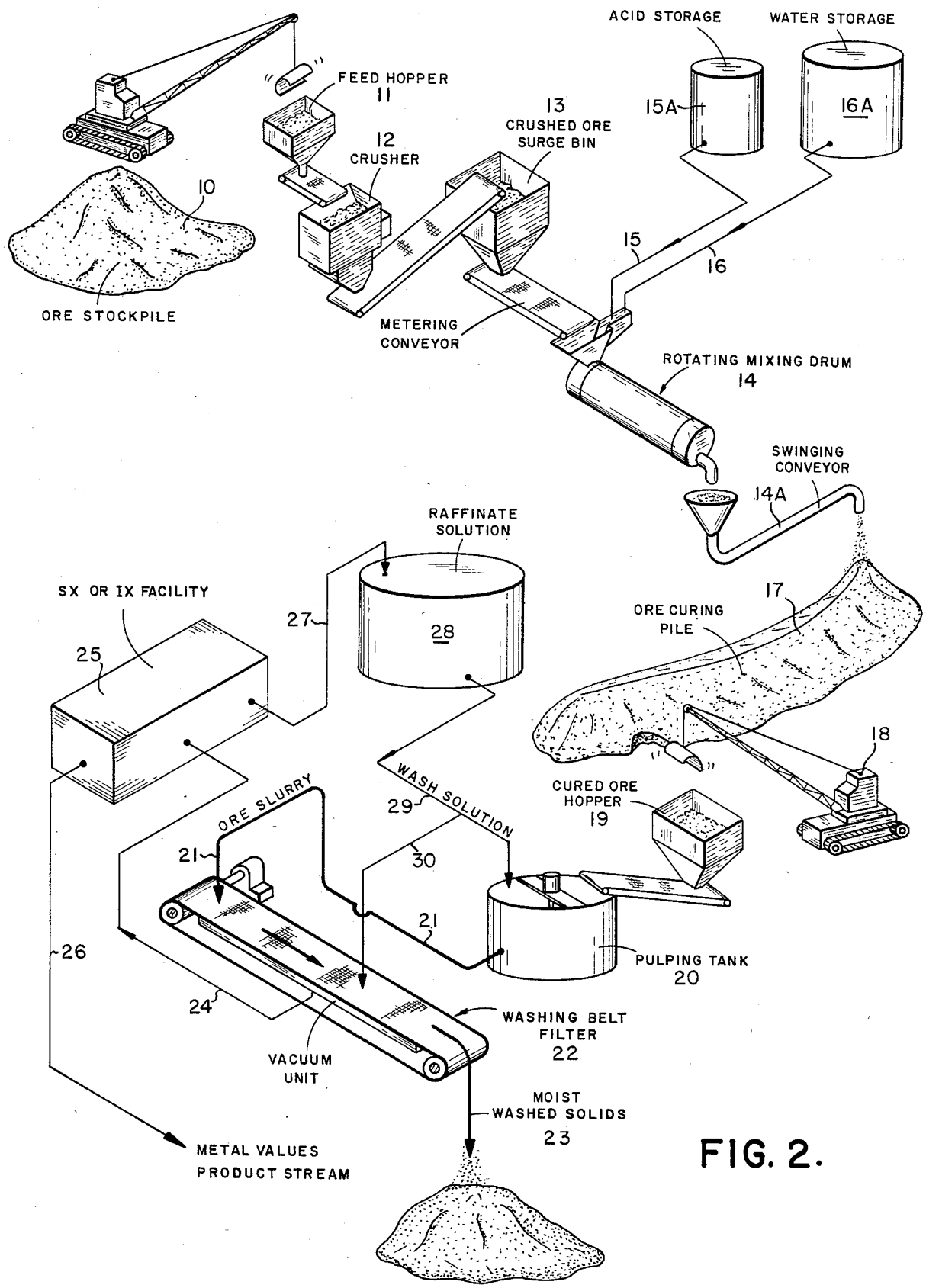
FIG. 2 is a perspective schematic showing the preferred technique of the invention in an overall scheme.

Each of the unit operations is clearly labeled in FIG. 2 which illustrates the preferred embodiment for uranium-bearing sandstone ores and it is essentially self-explanatory. In essence, the feed ore is loaded from stockpile 10 into feed hopper 11 where it passes to crusher 12 which is conveyed to crushed ore surge bin 13. From bin 13, the ore material is metered and conveyed to rotating mixing drum 14. Also, curing agent, usually acid, is conveyed to drum 14 via line 15 from storage tank 15A and water is conveyed to drum 14 via line 16 from storage tank 16A. The resulting reagent-ore mixture from drum 14 is conveyed on conveyor 14A to ore curing pile 17. In some instances an oxidizing agent may be added.

After an appropriate time period, selected to suit the particular ore and conditions, the cured ore from pile 17 is loaded via vehicle 18 into cured ore receiving hopper 19 and is then conveyed into the cured ore pulping tank 20. Although a particular vehicle is shown it will be understood that many equivalents exist.

The slurry in tank 20 is conditioned to a particular preselected composition. That slurry is then conveyed via line 21 to countercurrent washing belt vacuum filter 22 and moist solids are discharged from the top of the belt as moist solids 23. The liquid containing dissolved metal values is recovered from the bottom of belt filter 22 via line 24 whereby it is conveyed to a solvent extraction, ion exchange, eluex, or direct precipitation, etc. recovery facility 25. Metal values are recovered in a side stream through line 25 and the barren solution, e.g. raffinate, is conveyed via line 27 to barren solution or raffinate storage tank 28. This depleted wash solution can be used for slurrying the ore in pulping tank 20. If that expedient is used, the wash is conveyed via line 29. The filter 22 is a dewatering/washing device. When the belt makes its approximately 90° turn, at the conclusion of the dewatering, solid tailings are discharged at pile 23.

Depleted solution from tank 28 is used both for conditioning in pulping tank 20 as well as washing liquid through line 30 in belt filter 22. The vacuum belt filter 22, described as part of the overall sequence of FIG. 2 is further illustrated in a detailed side view schematic in FIG. 3. For instance, FIG. 3 indicates the location of vacuum zones 31 by which means, quick passage of wash liquid through the relatively thin ore layer 32 is accomplished. The filter itself is segregated into separate compartments over each vacuum zone by means of a series of divider dams 33. The thin ore layer passes under the divider dams while on the moving belt of the filter, from one zone to another. Full details of the design, construction and operation of the vacuum filter apparatus can be found in a publication entitled "Horizontal Belt Vacuum Filter", Bulletin Number F-18-B103, published in 1979 by the Joy Manufacturing Co., 621 South Sierra Madre, Colorodo Springs, Colo. 80903. This bulletin is incorporated herein by reference in its entirety, although sufficient description will be repeated here to avoid the necessity of referring to said bulletin.

Figure 3:
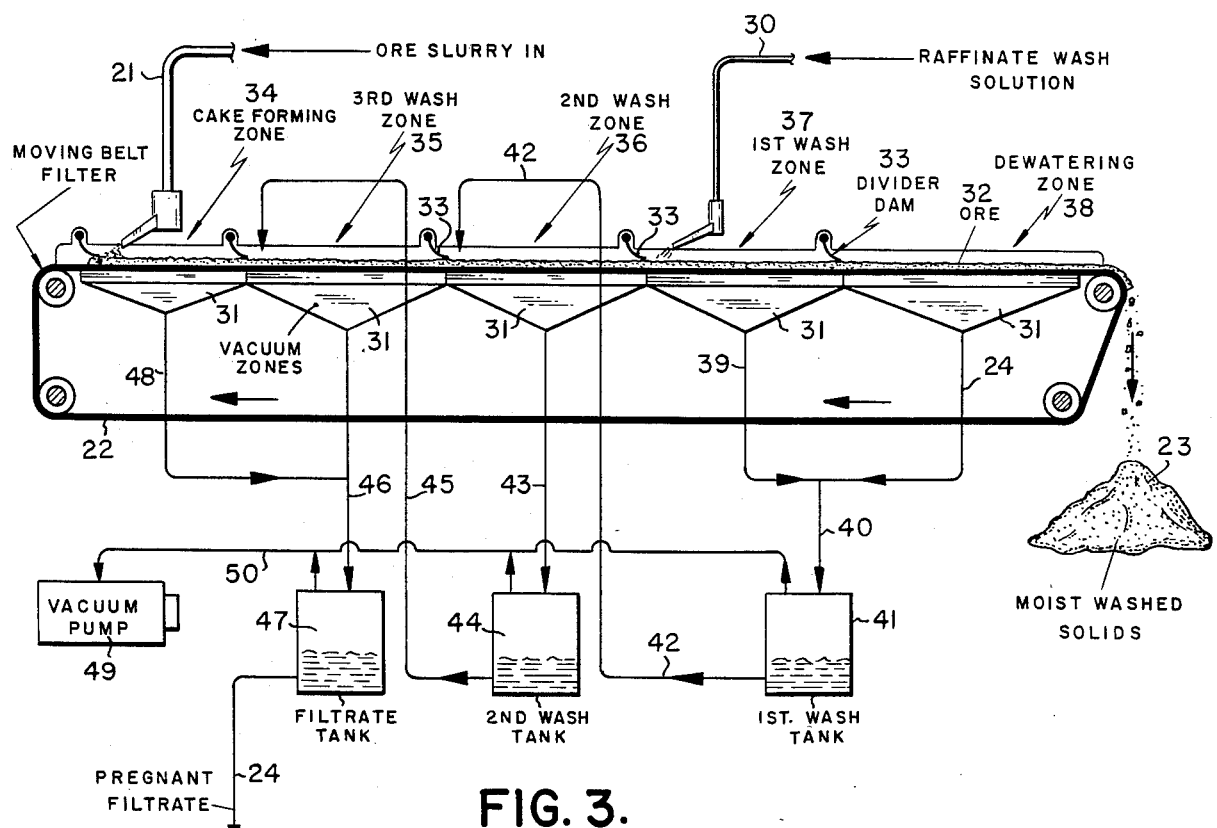
FIG. 3 is a schematic of a horizontal belt vacuum filter showing the features which make this preferred filter means exceptionally useful for the purposes of this invention.

This particular configuration of FIG. 3 also illustrates a preferred countercurrent washing arrangement which is carried out in a series of dewatering zones and washing zones. In essence, the first phase of the ore slurry treatment commences in a cake forming zone 34. Next, the ore passes to the third wash zone 35, subsequently to the second wash zone 36, next to the first wash zone 37, thence into a dewatering zone 38, whence it is discharged from the end of belt 22 resulting in the pile of moist solids of zone 23.

Raffinate wash solution is introduced through conduit 30 into the first wash zone 37 and the resulting enriched solution passes through the vacuum zone 31, out line 39, through conduit 40 into first wash tank 41.

Enriched wash solution from tank 41 which is a combination of filtrates from the first wash zone and the dewatering zone passes through line 42 up to second wash zone 36, where it is pulled through ore layer 32 as it passes over the vacuum zone 31 and exits by means of line 43 whereby it passes into second wash tank 44. From wash tank 44, more enriched wash solution passes through line 45 up to third wash zone 35, passes through the ore layer into vacuum zone 31 thence through line 46 into filtrate tank 47. Pregnant filtrate then is recovered from tank 47 via line 24 where it passes into an ion exchange unit where metal values are recovered.

The liquid from the first dewatering zone 33 passes through the ore body into vacuum zone 31 and thence by means of line 48 into line 46 where it becomes part of the washed liquid filtrate in tank 47.

Vacuum pump 49 supplies a pressure reduction force through line 50 whereby the pressure is reduced through the wash tanks and the filtrate tanks to provide the driving force focussed at the plane between the vacuum zone openings and the filter belt zones.

DETAILED DISCUSSION OF THE INVENTION

In general the inventive process entails crushing or comminution of the mined ore, mixing the comminuted ore with certain reagent along with only enough water to allow transport or diffusion of the reagent to the metal values, curing or allowing the ore-reagent mixture to sit (in a pile) to allow time for solubilization of the metal values, optionally rapid pulping and/or conditioning of the ore for filtration, and recovering of the metal values from the enriched filtrate simultaneously with a very rapid filtration cycle.

Crushing and mixing of cure reagent with the crushed ore is common to many processes. At the curing state differences begin to appear between various processes. The process of the invention requires curing only for the purpose of solubilizing the metal values and minimizing agglomeration. Excessive agglomeration is disadvantageous due to its limiting of solubilizing ion transport throughout the ore mass.

The quiescent submergence (QS) process of the art *requires* agglomeration as a means of limiting the disadvantageous effect of slimes as it depends entirely upon gravity filtration or drainage of the washing solution from the ore. The thin layer (TL) process of the art also requires agglomeration to increase drainage of the washing solution from the ore as well as induration to structurally strengthen and make the leach bed more permeable.

In the inventive process herein, the cured ore is usually slurried in preparation for filtration which results in destroying any agglomerates that may have formed. If agglomerates were introduced onto the countercurrent washing belt filter, they would greatly reduce its washing efficiency. Therefore, there is no beneficial effect of agglomeration in the inventive process. Indeed, agglomeration is quite detrimental.

To condition the ore for filtration in the inventive process, the ore is slurried with water for a very brief time to break up any aggregates that may have formed and to free ore particles that have been liberated or partially liberated by the reaction between reagent and ore particle cementing agents. This liberation is particularly effective when the cementing agents are calcites and the reagents are acidic such as sulfuric acid.

The conditioning of the ore in the preferred process sequence cannot be understated because of its extreme importance in obtaining washing efficiency of the countercurrent washing belt filter. Screening of the slurried ore is also an optional expedient to remove over-size ore particles and tramp material that may interfer with filtration.

In past and present usage of countercurrent washing belt filtration, the ores treated have first undergone crushing which produces a minimal amount of slimes (very fine ore particles), unless crushed to a very fine particle size. Then the ores are ground in some type of mill which further reduces the particle size and also creates significant amounts of very fine ore particles (slimes). After this, the ore is subjected to agitated leaching using large quantities of liquids which produces more slimes by attrition and liberates those slimes that are attached to larger ore particles. This requires a relatively large amount of fluid handling and storage tankage.

The inventive process eliminates the necessity for such grinding and requires at most a very brief pulping stage, thereby drastically reducing the slime content of the ore slurry to be filtered. This will greatly increase the efficiency and reduce the flocculant requirements for effective filtration, thereby, allowing much smaller volumetric units to be used than would be required if the ore was treated by conventional means.

The inventive process offers another significant advantage over the processes of the art by significantly reducing the volume of liquid required to separate metal values from the ore.

Countercurrent washing belt filtration presently operates at a recommended nominal one to one wash ratio; this alone is a dramatic improvement over the other processes.

This improvement can be further enhanced by using a portion of the filtrate (number one filtrate which would be combined with the filtrate from the cake forming stage to form the pregnant filtrate) to slurry the ore in preparation for filtration. Other combinations involving utilization of solution are available. While these are not mandatory, the option is not available at all in conventional processes.

There are several very important advantages to the solution utilization provided by the inventive process. For instance, when treating low grade ores, the concentration of metal values in the pregnant filtrate can be increased by as much as fifty percent (50%). By reducing the pregnant filtrate volume, the down stream recovery equipment can also be reduced in size. Also, in many geographical areas, the amount of process water available is severely limited. Since the inventive process can be operated with a minimal amount of wash solution, which is also recyclable, and the tailings are discharged at a nominal eighty percent (80%) solids, fresh water make-up requirements are extremely low.

An important stage of processing ore is to recover the metal values from enriched solution. The present state of the art calls for either solvent extraction, or ion exchange (resin), or a combination of the two (eleux), or direct precipitation. The method chosen to be used is highly dependent on the characteristics of the ore, such as grade and impurity or interfering elements. Therefore, no one recovery method can be solely endorsed for all ores.

But the low volume and high concentration of metal values in the pregnant filtrate makes direct precipitation, which is the most economical method, very attractive to the inventive process when an appropriate ore is being treated. Direct precipitation is not feasible for many art processes because of high solution volumes and lower solution concentrations.

EXAMPLES

The invention is further illustrated by the following examples.

Example 1

A friable sandstone uranium ore is crushed to nominal minus ½ inch size by an impact crusher. This material is conveyor fed into an ore-reagent mixing device similar to a rotary kiln. In this device the ore is mixed with appropriate amounts of sulfuric acid and sodium chlorate. Water is also added as needed in this device. This discharge from the ore-reagent mixing device dumps onto a belt conveyor and is deposited in curing piles on impervious pads. The ore cures for about 24 hours and is then fed into a slurrying tank and mixed with barren effluent from an ion exchange circuit. The slurry is approximately 66% solids at this stage. This slurry passes over a ¼ inch vibrating screen with a small flow of solution spray wash. The washed plus ¼ inch material is conveyed to tailings disposal. The slurry is now no less than 50 percent solids and is pumped to a countercurrent washbelt filter. The wash ratio is 1:1 and the wash solution is barren ion exchange effluent. The moist solids discharge is conveyed to tails and the filtrate is pumped to the ion exchange circuit. The uranium values are recovered by elution of the loaded resin and precipitation of yellow cake from the eluate. (Note: This is an illustrative example, not a working example.)

Example 2

A 400 gram sample of friable sandstone uranium ore with a head grade of 0.093 percent by weight $U_3O_8$ was crushed to minus ⅜ inch particle size. This ore was mixed with sulfuric acid (60 pounds per ton), sodium chlorate (2.3 pounds per ton), and water to bring the percent moisture of the sample up to 15%. The sample was then cured for 69 hours in an open beaker.

After curing, sulfuric acid solution at a pH of 2 was added to condition the sample for filtration. Four stages of cocurrent washing filtration were used of which the first solution volume was used for conditioning. The tail analysis from this test was 0.006 percent by weight $U_3O_8$ giving a 94 percent extraction. The total wash ratio was 2:1 yielding a calculated pregnant liquor grade of 0.41 grams per liter $U_3O_8$.

This sample was taken from ore being fed into a conventional agitated acid leach-CCD mill. Milling results on this ore are as follows:
1. head grade: 0.0925% $U_3O_8$
2. tail grade: 0.007% $U_3O_8$
3. acid consumption: 53.3 pounds per ton
4. sodium chlorate consumption: 2.3 pounds per ton.

Example 3

Highland Wyoming low grade ore, referred to as resource, contains a nominal 0.03% $U_3O_8$. The ore is fine to coarse sandstone concretions with calcite as the cementing agent. It also contains less than 1% pyrite and less than 1% carbon. There is a minimal amount of calcium carbonate, e.g. about 1%, and virtually no major interferring elements such as molybdenum or vanadium. Of greater concern is the small amount of granite, chert, and quartz pebbles that may interfer with filtration.

The following is a step by step procedure for processing Highland resource ore by the inventive process:
1. The reagent requirements are determined by quick reagent consumption tests conducted on ore samples representative of the ore to be mixed with reagents. These tests are based on reagent requirements for conventional agitated leaching but take much less time than leach amenability tests. A sample of the crushed ore is slurried at 50% solids and reagents added to achieve the proper pH and EMF readings. This ratio of reagent to ore is then used in the reagent-ore mixing apparatus.

2. The ore is crushed to a nominal minus ⅝ inch with all plus ¾ inch material recycled to the double impeller impact crusher for further size reduction. This ore is fed from the crusher into a small continuous feeder to eliminate surges in the ore stream from the crusher.

3. The constant ore feed from the continuous feeder is mixed with the appropriate amount of reagents in the ore mixing apparatus. This apparatus is similar to a rotary kiln. Water is also added as a reagent to control moisture content in the ore-reagent mixture at a level that will allow transport of the solubilizing ions to all metal values without seepage out of the ore.

a. Both crushing and ore-reagent mixing are operations lasting about 8 hours per day.

4. The ore-reagent mixture is conveyed to cure piles for the solubization process to occur. This process is essentially complete after 24 hours.

5. After 24 hours curing, the ore-reagent mixture is dumped into a continuous feeder which supplies the mixture, at a constant rate, to a small agitated tank for slurrying at 67% solids with either raffinate or number one filtrate. The piping will be such that either solution may be used for this purpose. If the number one filtrate is used, then the volume of pregnant filtrate will decrease and the metal value concentration will increase. The slurrying can be completed in as little as 5 minutes.

6. The slurry is then passed through a ¼ screen to remove granite, chert, and quartz pebbles along with tramp material that may interfer with filtration.

7. This cleaned slurry is then flocculated and fed onto the countercurrent washing belt filter.

8. The solids discharge is disposed of as tailings.

9. The pregnant filtrate is piped to the recovery unit which is continuous ion exchange. The barren solution is returned to the filtration unit as wash solution. Ion exchange eliminates the need to clarify the pregnant filtrate as would be required for solvent extraction or direct precipitation.

10. The eluate is precipitated and thickened to form a yellow-cake slurry product.

Example 4

This example uses Felder low grade ore referred to as protore. There are three major differences between this ore and the ore previously described. This ore contains a nominal 0.05% $U_3O_8$, 9.0% calcium carbonate, and significant quantities of both vanadium and molybdenum. These ore characteristics necessitate slight processing changes from Highland ore. The only procedural changes required are that much more acid will be required because of the high calcium carbonate content and the recovery system will have to be modified because of the high vanadium and molybdenum content.

Direct hydrogen peroxide precipitation will be used for recovery. Hydrogen peroxide precipitation does not remove significant quantities of either vanadium or molybdenum from the pregnant filtrate and thereby will eliminate both capital costs and operational problems involved when processing solutions with these impurities. One disadvantage to such a system is that the pregnant filtrate will have to be clarified to remove suspended solids, so that they do not contaminate the product.

It is to be emphasized that a key element of the preferred version of the instant invention is the use of essentially 100% of the solubilizing or cure agents entirely in the cure stage. Therefore, these agents are not required in any subsequent down stream process step. This requires that the cure reagents which are needed to effectively solubilize a particular ore must be determined by appropriate sample analytical tests before processing the main ore bodies.

Moreover, it is to be equally emphasized that the preferred process of the instant invention utilizes extremely low volumes of liquid, thereby minimizing the need for processing vessels, as well as permitting operation in areas with very low quantities of available water.

In this connection, the preferred embodiment of the invention is highly portable as well as extremely flexible. It can be suitably modified on a very simple basis to handle a wide verity of special problems created by the particular ore being processed or the particular conditions at the ore site.

Further, it is to be also emphasized that the processing relies upon extremely rapid leaching, which is in diametrical contest to the normal leaching techniques of the art. Thus small volumes of liquid are used to process the ore within a very short time frame.

In general, the thickness of the ore layer on the filtration means should be relatively thin. A suitable range of thickness is from about ⅛ of an inch to about 12 inches, preferably ⅛ of an inch to about 3 inches, and preferably about ½ of an inch to 2 inches in total thicknesses.

The liquid to ore ratios, which are very low compared to conventional processes will generally require approximately 0.25 to 3 parts by weight of liquid (usually water) per each part by weight of mineral ore being processed, more preferably, ½ to 1½ parts by weight liquid per each single part by weight of ore and most preferably, ¾ to 1¼ part by weight of liquid per each part by weight of ore.

Another key feature of the invention is the rapidity of the leaching process. In general, when the horizontal belt vacuum filter or equivalent means is used, the entire leaching time to which a single particle ore is exposed will range in length from as low as 15 seconds to as high as 30 minutes, preferably, 15 seconds to 5 minutes and most preferably about 30 seconds to 3 minutes.

Of course, the relevant parameters of ore type, location, cure agent, etc. will interact to a large extent with each other and will require suitable adjustment depending on the particular conditions. Thus, the nature of the ore, the particular specifications of the filter means and other pertinent considerations must be balanced, as will be apparent to one skilled in the art, to obtain optimum benefits from this invention.

What is claimed is:

1. In the process of extracting metal values from mineral ores which comprises comminuting said ores into smaller ore particles, curing said ores and leaching said ores, the improvement which comprises the steps in combination of:

(a) contacting said ores with only a sufficient amount of a selective curing reagent to convert said metal values into a soluble state and to avoid appreciable leaching;

(b) conditioning said cured ore by mixing it with a flocculating agent and sufficient water to convert it into a pumpable and flocculated state;

(c) conveying said cured, solubilized, conditioned, flocculated ore without additional processing to an operational horizontal-belt, vacuum, filter dewatering/washing forced-flow apparatus;

(d) depositing a single relatively thin layer of said conveyed ore, not exceeding 12 inches in thickness on said apparatus; and (e) rapidly washing said thin ore layer several times with a suitable washing solution in order to leach by dissolving and removing substantially all solubilized metal values from said solubilized ore within a wash time period not exceeding about 30 minutes per ore particle using about 0.25 to 3 parts by weight of washing solution per weight of ore in said layer.

2. The process of claim 1 wherein said wash liquid comprises filtrate.

3. The process of claim 1 wherein no additional curing reagent is added to said process after step (a).

4. The process of claim 1 wherein said wash liquid is advanced countercurrently to the ore on said apparatus.

5. The processes of claim 1 wherein said ore is a sandstone type ore.

6. The process of claim 1 wherein said ore is uranium ore.

* * * * *